July 17, 1962     NIRO AKAHANE     3,044,383
EXPOSURE CONTROL

Filed Feb. 2, 1960     3 Sheets-Sheet 1

INVENTOR.
NIRO AKAHANE
BY Stanley Wolder
ATTORNEY

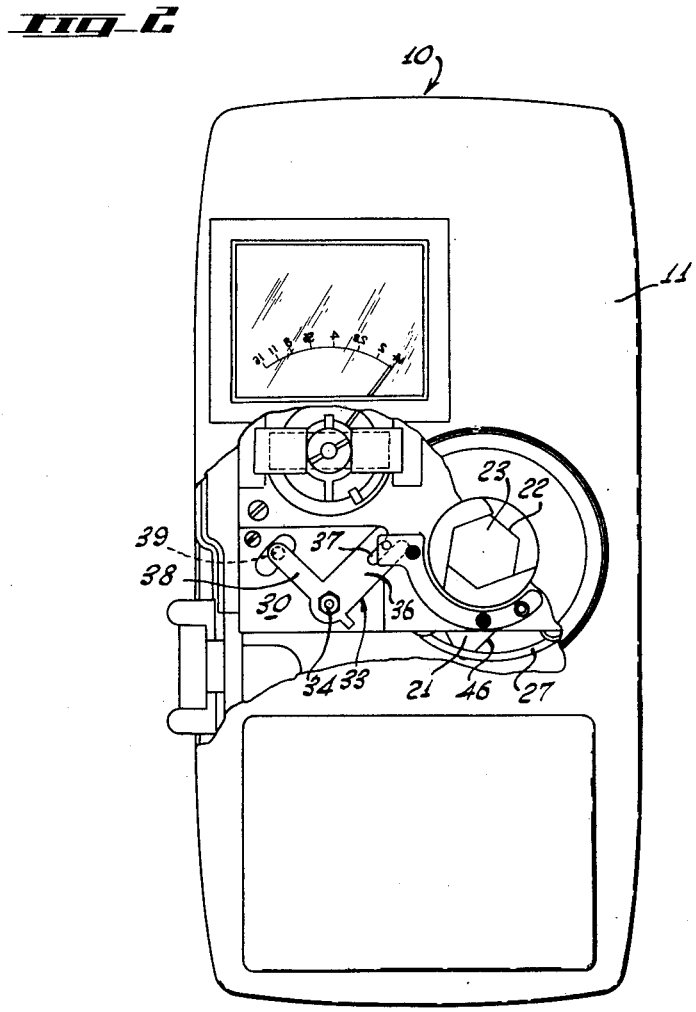

July 17, 1962 NIRO AKAHANE 3,044,383
EXPOSURE CONTROL
Filed Feb. 2, 1960 3 Sheets-Sheet 3
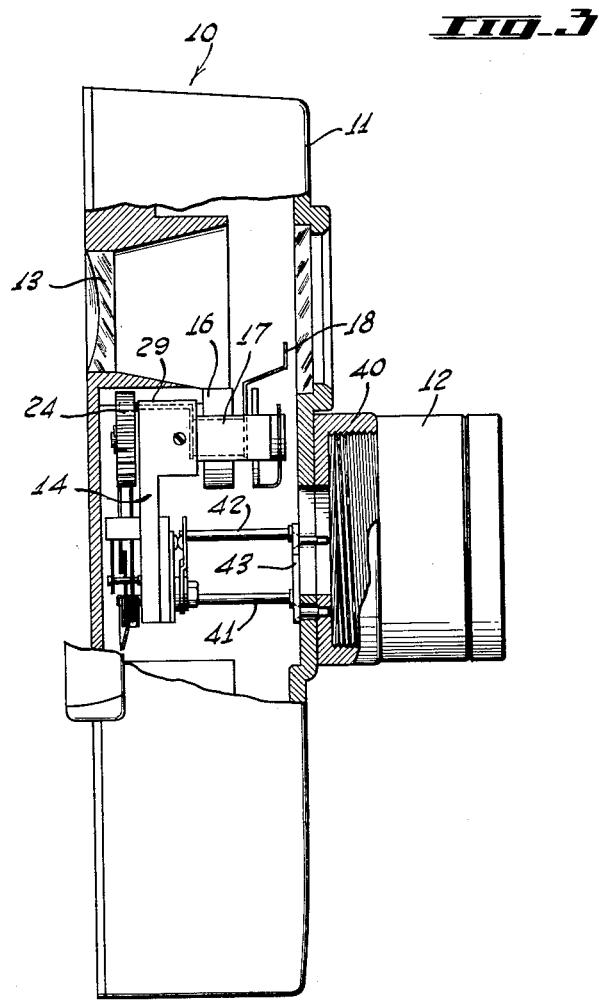
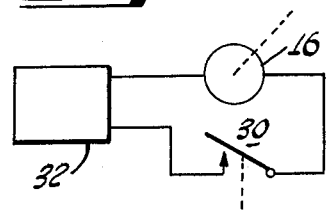
INVENTOR.
NIRO AKAHANE
BY
ATTORNEY United States Patent Office 3,044,383
Patented July 17, 1962

3,044,383
EXPOSURE CONTROL
Niro Akahane, Suwa-gun, Nagano-ken, Japan, assignor to Yashica Co., Ltd. (Japanese name Kabushiki Kaisha Yashica), Tokyo, Japan, a corporation of Japan
Filed Feb. 2, 1960, Ser. No. 6,157
Claims priority, application Japan Feb. 5, 1959
2 Claims. (Cl. 95—64)

The present invention relates generally to improvements in photographic cameras and it relates more particularly to an improved camera diaphragm mechanism which may be selectively automatically or manually controlled.

In the conventional camera and particularly in motion picture cameras the primary method of controlling the light incident upon the film is by adjusting the aperture of the lens diaphragm. Where the lighting conditions and the shutter speed are predetermined the diaphragm is the sole mechanism for such light control. Many cameras are now provided with means which automatically adjust the diaphragm opening in accordance with the light conditions. These means generally include a photoelectric cell which energizes an ammeter, the armature of which is coupled to and actuates the lens diaphragm to adjust the opening thereof. While under normal circumstances the operation of the automatic diaphragm is generally satisfactory there are many occasions when the lighting conditions are such that the automatically adjusted diaphragm is not of the optimum or desired aperture. Such is usually the case, for example, where the average lighting of the central subject matter is radically different from the background lighting. Thus when the object of interest is darker than the surroundings a wider diaphragm aperture than automatically obtained is often desirable and when the object is brighter than the surroundings a smaller aperture is usually called for. It is therefore apparent that the automatic diaphragm arrangement, under many conditions of lighting possesses certain disadvantages and leaves something to be desired.

It is thus a principal object of the present invention to provide an improved photographic camera.

Another object of the present invention is to provide a photographic camera having an improved automatically adjusted diaphragm mechanism.

Still another object of the present invention is to provide a camera with an improved diaphragm mechanism which is selectively automatically self adjusting and manually adjustable.

A further object of the present invention is to provide a camera of the above nature characterized by its simplicity, ruggedness, versatility and low cost.

The above and other objects of the present invention will become apparent from a reading of the following description taken in conjunction with the accompanying drawings wherein:

FIGURE 2 is a view similar to FIGURE 1, partially broken away and showing the manual diaphragm adjusting mechanism;

FIGURE 3 is a side elevational view thereof illustrated partially broken away; and FIGURE 4 is a schematic diagram of the diaphragm electrical section.

Figure 1:
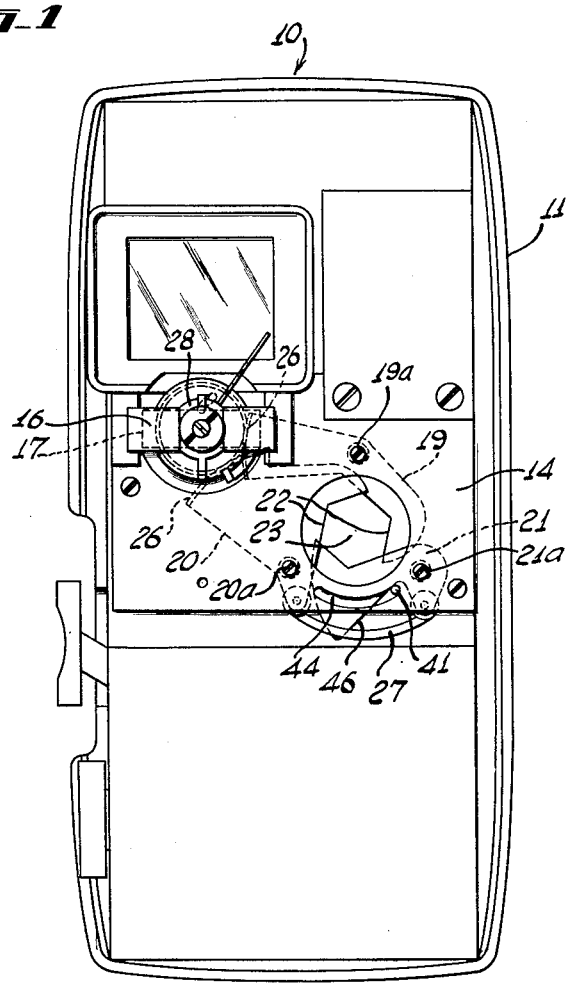
FIGURE 1 is a front elevational view of a camera embodying the present invention illustrated with the manual diaphragm adjusting mechanism broken away.

In a sense the present invention contemplates the provision of an improved camera of the character described comprising a diaphragm having a variable opening, a photosensitive member, means responsive to said photosensitive member automatically adjusting said diaphragm opening in accordance with the light incident thereon, manually motivated means for adjusting said diaphragm and means responsive to said manual means for disabling said automatic adjusting means.

According to a preferred form of the improved device the photosensitive member is a photoelectric cell which is connected by way of normally closed switch to a sensitive ammeter having a rotatable armature spring urged to a retracted position. The diaphragm is defined by a plurality of connected pivoted iris plates the inner edges of which delineate the diaphragm opening, at least one of the plates being connected to the meter armature so that the diaphragm opening varies in accordance with the light incident upon the photoelectric cell. The diaphragm manual control member includes a ring rotatably mounted on the camera lens barrel and provided with a first cam follower element which is adapted to engage the cam defining outer edge of one of the iris plates and a second element engaging the switch. Thus upon rotation of the manual control ring from its retracted position the switch is opened to deenergize the meter and release the diaphragm to its open position which may then be manually adjusted.

Referring now to the drawings which illustrate a preferred embodiment of the present invention the reference numeral 10 generally designates the improved camera which includes, a casing 11, carrying a main lens barrel 12 and a viewing lens system 13. Disposed within the casing 11 is a transversely extending vertical support plate 14 which has mounted on its upper part a sensitive current meter 16 provided with a rotatable armature 17 which may be of the conventional swinging coil type and which is spring urged to its retracted position in the usual manner. An indicator arm 18 is carried by the armature 17 and is viewable through the lens 13 against a window carried indicia background.

The diaphragm includes three iris plates 19, 20 and 21 which are pivoted to the support plate 14 at points 19a, 20a and 21a respectively and are provided with cooperating inner perimeters or edges 22 which delineate a variable diaphragm opening 23 in axial alignment with the camera main lens. A gear 24 is mounted on the upper part of support plate 14 and engages racks 26 located along the trailing ends of arms projecting from the iris plates 19 and 20. A link 27 connects correspondingly eccentric points on the iris plates 20 and 21 so that rotation of the gear 23 is accompanied by a corresponding swinging of the iris plates 19, 20 and 21 to vary the diaphragm opening symmetric to the center thereof. A groove or slot 28 is formed in the gear 24 and is engaged by a rearwardly directed arm 29 mounted eccentrically on the meter armature 17 to move with the meter armature 17 and thereby rotate the gear 24 and vary the diaphragm opening 23 upon energization of the meter 16. A full and detailed description of the subject diaphragm mechanism is set forth in the copending application Serial No. 845,-163 filed October 8, 1959 in the name of Niro Akahane.

The meter 16 is connected by way of a switch 30 to a photoelectric cell 32 which is located on the camera front face in the usual manner. The switch 30 is mounted on the front face of the support plate 14 and includes an L-shaped lever 33 pivoted at its elbow by a pin 34 and includes a first arm 36 forked at its end to provide a slot 37, and a second arm 38. A contact element 39 underlies the path of the end of the arm 38 when the latter is in its retracted position, as illustrated in FIGURE 2 of the drawing, and disengages the arm 38 when the lever 33 moves clockwise to an open switch position. The contact 39 and the lever 33 define the terminals of the switch 30 which are connected to respective terminals of the photoelectric cell 32 and the meter 16.

The diaphragm manual control member includes a rotatable ring 40 located at the base of the lens barrel 12. A pair of rearwardly directed first and second rods 41 and 42 respectively are mounted on the ring 40 by a suitable support structure 43 and are parallel and eccentric to the longitudinal axis of the lens barrel 12. The free end of the rod 42 registers with the slot 37 in the switch arm 36 and when the ring 40 is in its clockwise most retracted position, as seen in FIGURE 2, the switch 30 is closed and when it is advanced counterclockwise the lever 33 is swung clockwise to open the switch 30. The free end portion of the rod 41 passes through and slidably registers with an arcuate guide slot 44 formed in the support plate 14 and which is concentric with the axis of the lens barrel 12. The iris plate 21 has an inclined outer edge 46 which defines a cam surface extending transversely across the face of the slot 44. It should be noted that when the diaphragm is in its fully open position the cam surface 46 intercepts the slot 44 adjacent its right end, as seen in FIGURE 1, and confronts the rod 41 which defines a cam follower and registers with the right end of the slot 44 when the adjusting ring 40 is in its retracted position.

The operation of the improved camera is obvious from the above description. When the control ring 40 is in its fully retracted position the rod 41 is free of the path of the iris plate 21 and the rod 42 closes the switch 30 to connect the photoelectric cell 32 to the meter 16 energizing the latter to effect the automatic adjustment of the diaphragm opening 23 as aforesaid. To manually adjust the diaphragm opening 23 the ring 40 is advanced so that the rod 42 swings the lever 33 clockwise, opening the switch 30 and deenergizing the meter 16. As a consequence the iris plates are spring urged to their openmost position, as limited by the position of the rod 41, by the armature 17. The advancement of the ring 40 also advances the rod 41 which bears against the iris plate cam edge 46 to swing the iris plate 41 inwardly toward a closed position, and concurrently therewith the iris plates 19 and 20 by way of the link 27, racks 26 and gear 24. When the ring 40 is returned to its retracted position the rod 41 is retracted along the slot 44 and the armature 17 takes over full control of the diaphragm, and the switch 30 is closed to return the diaphragm to automatic operation.

While there has been described and illustrated a preferred embodiment of the present invention it is apparent that numerous alterations, omissions and additions may be made without departing from the spirit thereof.

What is claimed is:

1. An improved camera of the character described comprising a body member, a main lens barrel mounted on said body member, a diaphragm aligned with said barrel and including a plurality of pivoted iris plates having inner edges delineating the diaphragm variable opening and means coupling and concurrently moving said iris plates, one of said iris plates being provided with an outer edge defining a cam surface non-radial relative to the pivot point of said iris plate, an electrically actuated motor device having an armature movable between a retracted and an advanced position and normally urged to a retracted position, means coupling said armature to at least one of said iris plates to concurrently move said iris plates with said armature, a photoelectric cell, means including a normally closed switch connecting said photoelectric cell to said electrically actuated motor device, a manual control ring mounted on said lens barrel and rotatable between an advanced and a retracted position, a cam follower defining a rearwardly directed first arm mounted on said ring and engaging said cam surface and movable with said ring along a path eccentric to the pivot point of said cam carrying iris plate to vary said diaphragm between its open and closed positions, and a second rearwardly directed arm mounted on and movable with said ring and engaging said switch to open said switch when said ring is in advance of its retracted position.

2. An improved camera of the character described comprising a diaphragm continuously movable between a fully open and a relatively closed position, a photoelectric cell, an electrically actuated motor device having an armature movable between a retracted and an advanced position and normally urged to a retracted position, said diaphragm being defined by a plurality of pivoted iris plates having inner edges delineating the diaphragm opening and means coupling and concurrently moving said iris plates, means connecting said armature to at least one of said iris plates to urge said diaphragm toward its closed position upon advance of said armature, means including a normally closed switch connecting said photoelectric cell to said electrically actuated motor device, a manually actuated member movable between a retracted and advanced position, one of said iris plates being provided with an outer edge defining a cam surface, said manually actuated member being provided with a cam follower element adapted to engage said cam surface and movable along a path which is eccentric relative to said pivot point of said one iris plate, said cam follower element being adapted to engage said cam surface to urge said diaphragm toward its closed position upon advance of said manually actuated member, and means responsive to the movement of said manually actuated member from its retracted position for opening said switch.

References Cited in the file of this patent
UNITED STATES PATENTS

| 2,841,064 | Bagby et al. | July 1, 1958 |
| 2,923,170 | Pfaffenberger | Feb. 2, 1960 |
| 2,996,968 | Lunzer | Aug. 22, 1961 |